(12) United States Patent
Tu et al.

(10) Patent No.: US 7,648,901 B2
(45) Date of Patent: Jan. 19, 2010

(54) MANUFACTURING PROCESS AND APPARATUS THEREFOR UTILIZING REDUCING GAS

(75) Inventors: Ping Liang Tu, Hong Kong (CN); Deming Liu, Hong Kong (CN); Kui Kam Lam, Hong Kong (CN); Man Chung Raymond Ng, Hong Kong (CN)

(73) Assignee: ASM Assembly Automation Ltd., Hong Kong (HK)

( * ) Notice: Subject to any disclaimer, the term of this patent is extended or adjusted under 35 U.S.C. 154(b) by 362 days.

(21) Appl. No.: 11/536,051

(22) Filed: Sep. 28, 2006

(65) Prior Publication Data

US 2008/0078145 A1    Apr. 3, 2008

(51) Int. Cl.
*H01L 21/44* (2006.01)

(52) U.S. Cl. ............... 438/613; 438/455; 438/612; 257/E23.023

(58) Field of Classification Search ............ 438/455, 438/612, 613
See application file for complete search history.

(56) References Cited

U.S. PATENT DOCUMENTS 6,344,407 B1 *   2/2002   Matsuki et al. ............. 438/613
6,786,391 B2 *   9/2004   Stipp et al. ............. 228/180.22

* cited by examiner

*Primary Examiner*—Alexander G Ghyka
(74) *Attorney, Agent, or Firm*—Ostrolenk Faber LLP

(57) ABSTRACT

A manufacturing process and apparatus therefore are provided for processing an electronic device comprising oxidizable material during processing. The electronic device is located inside a chamber and is heated a processing temperature with a heater. A reductive atmosphere is created in the chamber by supplying a gas comprising glycolic acid vapor while processing the electronic device at the processing temperature.

12 Claims, 2 Drawing Sheets

MANUFACTURING PROCESS AND APPARATUS THEREFOR UTILIZING REDUCING GAS

FIELD OF THE INVENTION

The present invention relates to assembly and packaging of electronic devices and more particularly to bonding or bumping processes utilizing solder.

BACKGROUND AND PRIOR ART

Soldering technology is widely used in microelectronics and optoelectronics for making electrical and mechanical connections. Conventional soldering methods typically use a liquid flux to promote wetting of solder on a base metal. Flux residues must then be removed from the soldered assembly. Although the residues are generally not electrically conductive, they are corrosive and can cause long term reliability problems. For semiconductor and electronic packaging, the use of liquid flux is further limited due to concerns about contamination of optically active surfaces by organic residue. To meet such considerations, it is generally desirable to employ fluxless soldering during bonding or bumping, typically by using gaseous reducing reagents.

A forming gas comprising a mixture of nitrogen and hydrogen is one type of gaseous reducing reagent utilized to create a reductive atmosphere for soldering die bonds as well as Au/Sn eutectic die bonds. The forming gas mixture can be made of various compositions, but usually, it has a high nitrogen content mixture with the balance being hydrogen gas. Previously, forming gas was applied during brazing at between 650-850° C. to remove oxides and prevent these oxides from forming since the hydrogen would react with any compound capable of creating an undesirable oxide layer. Presently, forming gas (eg. N2&5-15% H2) is widely used in the semiconductor/electronic packaging industry for soft solder die bonding and Au/Sn (Si) eutectic die bonding and other packaging processes because it is convenient and clean.

However, forming gas generally becomes an active gas above a temperature of 350° C. It can be therefore only used as protective gas at temperatures below the active temperature. High $H_2/H_2O$ pressure ratios or long reaction times are needed for deoxidization with forming gas. Whilst it is convenient and clean, it is insufficiently effective to remove oxide and prevent solder from re-oxidizing. Moreover, there is an initiation temperature below which the reduction is insignificant and above which the reduction process is accelerated. For instance, for a flip chip bonded with 40 μm solder bumps (90Pb/10Sn), the initiation temperature is about 370° C. It is thus necessary to heat the substrate independent of the solder's melting point to temperatures above 350-370° C.

Other solutions focus on the use of various chemical vapors to create reductive atmospheres. In one such solution, formic acid vapor is used as a reaction gas for fluxless soldering. For example, in U.S. Pat. No. 6,344,407 entitled "Method of Manufacturing Solder Bumps and Solder Joints using Formic Acid", formic acid is used in a reduced pressure atmosphere to form solder bumps on an underlying metal flim of a semiconductor device.

Also, in U.S. Pat. No. 6,207,551 entitled "Method and Apparatus using Formic Acid Vapor as Reducing Agent for Copper Wirebonding", formic acid vapor is introduced to a bonding zone to remove copper oxide during wirebonding operations to copper metal pads to permit good wirebonds to be achieved. In one aspect of the invention, the concentration of formic acid vapor is controlled by mixing the formic acid vapor with a gas such as nitrogen that does not participate in the reduction chemical reactions.

Formic acid is an effective reactive gas for removing surface oxide on solders, and is active at typical soldering temperatures (about 220° C.) due to its low decomposing temperature (about 150° C.). Also, implementation of processes utilizing formic acid is relatively simple. However, formic acid has certain disadvantages. One disadvantage is that it must be used in a closed environment during fluxless soldering due to its strong corrosiveness, pungent odor and toxicity to humans. Any formic acid residue remaining after the process must also be controlled and safely exhausted, which increases handling complexity.

SUMMARY OF THE INVENTION

It is thus an object of the invention to seek to provide a manufacturing process and apparatus therefore which avoids the use of flux during bonding processes. It is a further object of the invention to seek to provide a reducing atmosphere using a gas that avoids the aforesaid disadvantages of formic acid.

According to a first aspect of the invention, there is provided a method for processing an electronic device comprising oxidizable material during processing, the method comprising the steps of: locating the electronic device inside a chamber; heating the electronic device to a processing temperature with a heater; creating a reductive atmosphere in the chamber by supplying a gas comprising glycolic acid vapor; and processing the electronic device at the processing temperature.

According to a second aspect of the invention, there is provided an apparatus for processing an electronic device comprising oxidizable material during processing, comprising: a chamber for locating the electronic device for processing; a heater for heating the electronic device to a processing temperature; and a supply of gas comprising glycolic acid vapor that is operative to generate a reductive atmosphere in the chamber during processing of the electronic device.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

Examples of bonding processes and apparatus in accordance with the invention will now be described with reference to the accompanying drawings, in which.

DETAILED DESCRIPTION OF THE PREFERRED EMBODIMENT OF THE INVENTION

Figure 1:
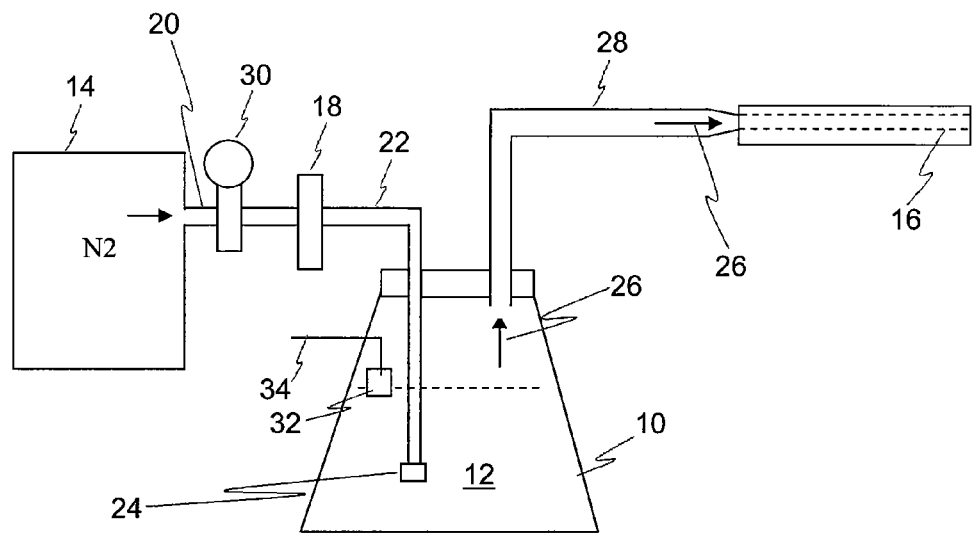
FIG. 1 is a schematic diagram illustrating the manner in which glycolic acid vapor in accordance with the preferred embodiment of the invention may be produced.

FIG. 1 is a schematic diagram illustrating the manner in which glycolic acid vapor in accordance with the preferred embodiment of the invention may be produced. A reservoir 10 of glycolic acid (GA) solution 12 is provided. The preparation of the solution is preferably performed by dissolving GA powder, such as GA99.5% crystal powder, in ethanol. The ratio range of GA to ethanol is preferably from 1 gram:1 ml to 1 gram:10 ml (the most preferable ratio is 1 gram:2 ml).

A source of inert gas, preferably nitrogen gas 14, is also provided. The GA solution 12 is vaporized and carried by the nitrogen gas 14. The nitrogen gas 14 flows through the GA reservoir 10 and is then introduced into a processing chamber 16 (such as a heat tunnel) with GA vapor carried by it. The flow rate of nitrogen gas is controlled by a valve mechanism in a flow sensor-controller 18. The flow sensor-controller 18 is used to increase or decrease the flow rate of the nitrogen gas 14 through the first conduit 20 to meet the requirement of the soldering process. A second conduit 22 is connected to a gas feed attachment 24 that is immersed into the GA solution 12.

Nitrogen gas 14 bubbles out of the gas feed attachment 24 into the GA solution 12. When the nitrogen gas bubbles through the reservoir 10 containing the GA solution 12, GA vapor 26 attaches itself to the inert nitrogen gas which acts as a carrier. It is then generated in gaseous form and flows through a third conduit 28 as it is attached to the carrier nitrogen gas 14. The vapor concentration depends on the vapor pressure of the GA solution 12, and the vapor pressure is generally affected only by the GA solution temperature. Therefore, the flow rate of GA vapor 26 from the reservoir 10 depends on the flow rate of the carrier nitrogen gas 14 through the first and second conduits 20, 22 as controlled by the flow sensor-controller 18. A pressure sensor-controller 30 is used to sense and regulate the pressure of the source of nitrogen gas to limit the gas pressure in the reservoir 10.

A level sensor-controller 32 is used to control fluid communication with the GA solution 12 in the reservoir 10. It senses the level of the GA solution 12 in the reservoir 10 to control a valve mechanism 34 to close or to open the valve for feeding additional GA solution 12 from a source of GA solution (not shown).

The GA vapor 26 is mixed with nitrogen gas 14 as the nitrogen gas flows from the second conduit 22, and the mixture is provided to the processing chamber 16 through the third conduit 28. By adjusting the flow sensor-controller 18, the flow rate of the gas mixture including the GA vapor 26 may be controlled as desired for supplying the same to the processing chamber 16.

Figure 3:
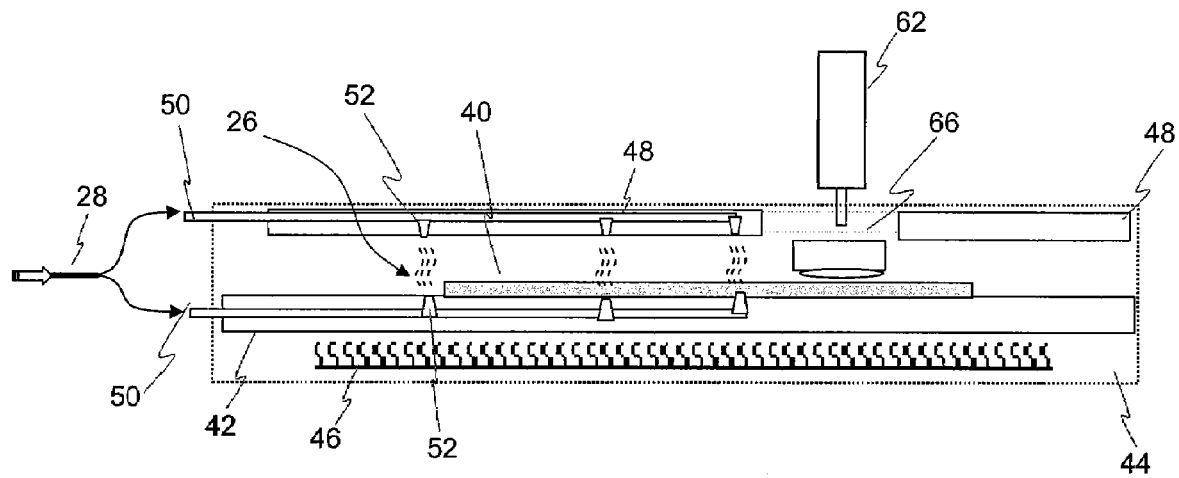
FIG. 3 is a schematic representation of a eutectic die bonding system showing how the glycolic acid vapor may be used as a reducing agent during solder attach bonding.
Figure 4:
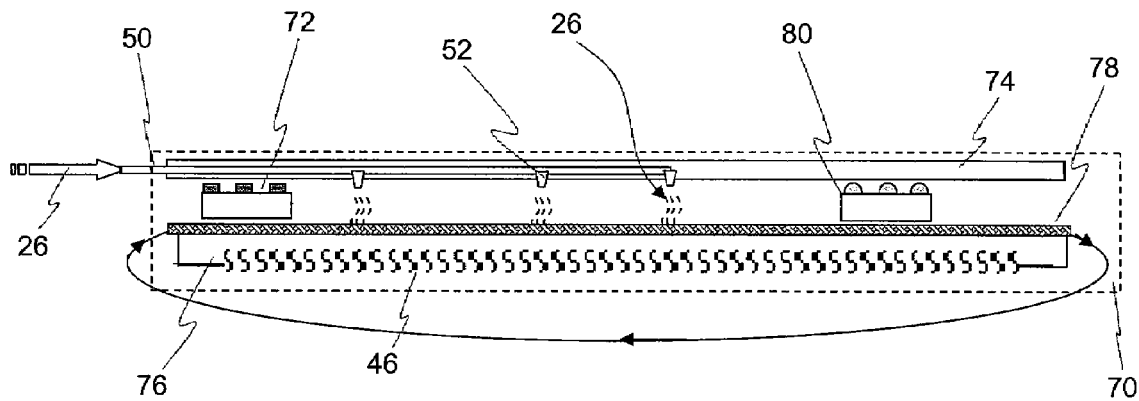
FIG. 4 is a schematic representation of a bumping oven showing how glycolic acid vapor may be used as a reducing agent during solder bumping.

Active GA vapor is thus introduced into processing chamber 16 for bonding/bumping. According to the present invention, die bonding using solder or solder bumping is preferably performed in a reductive atmosphere containing the active GA vapor at working temperatures of 250 to 500° C. Further details of different processing chambers 16 implementing different embodiments of bonding systems are shown in FIGS. 2, 3 and 4.

Figure 2:
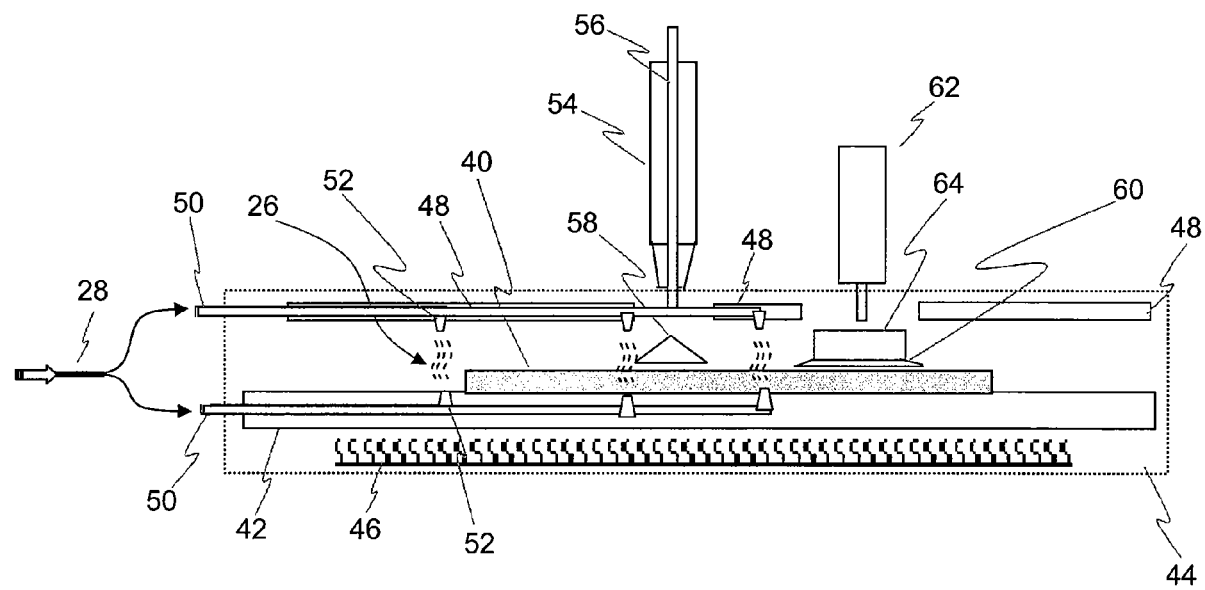
FIG. 2 is a schematic representation of a soft solder die bonding (SSDB) system showing how the glycolic acid vapor may be used as a reducing agent during die bonding.

FIG. 2 is a schematic representation of a soft solder die bonding (SSDB) system showing how the GA vapor may be used as a reducing agent during die bonding.

A die bond platform is typically in the form of an electronic device such as a lead frame (LF) 40 including one or more bonding pads to which semiconductor dice are to be bonded. The bonding pads may be plated with Ag or Ni on a base copper material, or may be unplated. Therefore, the LF 40 can be a Ag-plated, Ni-plated, or bare copper LF. The LF 40 is held on an anvil block 42 located in a bonding chamber, which may comprise the heat tunnel 44 including the heater 46, anvil block 42 and cover 48. GA vapor 26 is introduced into the heat tunnel 44 as a reducing gas through conduits 28, 50 and nozzles 52 to create a reductive atmosphere in the heat tunnel 44. The heater 46 is used to heat the LF 40 and the GA vapor 26 in the nitrogen gas carrier to a bonding temperature in the range of 250 to 400° C. The heat tunnel 44 is not quite a closed chamber since the cover 48 has to have some opened windows for indexing/bonding operations, for example, a dispensing-spanking apparatus 54 is used to perform solder dispensing and spanking operations.

The LF 40 is first heated to or above the solder working temperature in the heat tunnel 44 with the GA vapor ambient. Secondly, solder wire 56 is dispensed onto the heated LF 40 to form a solder dot 58. Thereafter, the apparatus 54 is also used to spank the solder dot 58 on the LF 40 to form a solder pattern 60 for die bonding. The apparatus 54 can preferably be designed into two modules, a dispenser and a spanker apparatus. The former is used to dispense solder wire on LF pads, and the latter is used to spank the solder dot on LF pad to form a solder pattern for an application device. A die bonding apparatus 62 is provided to pick up an electronic device 64, such as a semiconductor die with an attached metallization layer, which is then bonded onto the LF 40 with the solder pattern 60. The above dispensing, spanking, and bonding processes are performed under a reductive atmosphere including the GA vapor 26. Since a flat regular solder pattern without oxide formation is necessary to bond the device 64 on the LF pads without die tilting and voids in the solder layer, the GA vapor 26 promotes die bonding without attendant die tilt and voids.

FIG. 3 is a schematic representation of a eutectic die bonding system showing how the GA vapor 26 may be used as a reducing agent during solder attach bonding.

The die bond platform may be an electronic device in the form of a LF 40 or substrate having a structure defining circuit device elements, and includes one or more layers of metal interconnects that have one or more metal pads to which dies are to be bonded. A die bonding apparatus 62 is used to perform die bonding operations. GA vapor 26 in a nitrogen gas carrier is introduced into a chamber, such as heat tunnel 44, as a reducing gas through conduits 28, 50 and nozzles 52 to create a reductive atmosphere in the heat tunnel 44. The LF 40 is held on the anvil block 42 located in the heat tunnel 44 and preheated in the heat tunnel 44 under a GA vapor ambient to 270-500° C. A die 66 is then attached with a solder layer or bumping on its backside for direct die bonding with the die bonding apparatus 62. Typically, the die 66 is a high power device or flip-chip, which is picked-up and placed on the pads of the LF 40. The solder-attach layer on the backside of the die 66 is placed onto a pad of the LF 40. The die bonding is performed using a suitable bond force on the device at a solder working temperature. The die bonding process is also performed under a GA vapor 26 ambient.

FIG. 4 is a schematic representation of a processing chamber in the form of a bumping oven 70 showing how GA vapor 26 is used as a reducing agent during solder bumping. Active GA vapor is used as a reducing gas for solder bumping.

An electronic device, such as semiconductor device 72, has one or more solder bumps provided over an underlying metal film by electrolytic plating, printing or solder ball putting. The semiconductor device 72 is put into and passes through the bumping oven 70 with the reductive atmosphere containing the GA vapor 26. GA vapor 26 is introduced into a bumping oven 70 as a reducing gas through conduits 28, 50 and nozzles 52. The solder bumps on the device 72 are heated to reflow the solder balls. The bumping oven 70 comprises a cover 74, heater 46, support 76 and convection system 78. During the bumping process, the semiconductor device is heated/melted by the heater 46. Spherical solder bumping on the device is performed by reflowing the solder balls when they pass through the bumping oven 70 with a GA vapor ambient at a solder working temperature of 200-320° C. The solder balls are formed from solder bumps on the device 72. Hence, a bumped device 80 with solder balls is produced.

The preprocessing of the reductive atmosphere containing the GA vapor 26 may be adopted as follows. Preferably two or more nozzles 52 are provided on the anvil block 42 and the cover 48. The nozzles 52 are connected to the third conduit 28 via the fourth conduit 50 for introducing the gas mixture including GA vapor 26 into the bonding heat tunnel 44 or bumping oven 70 for soldering die bonding or bumping, respectively. The GA vapor 26 preferably comprises a mixture of gaseous GA mixed with nitrogen gas, or any other suitable gas that is preferably inert during the chemical reactions of interest.

The GA vapor 26 is supplied at a temperature of between 250° C. and 500° C., and maintained at a reaction temperature within this range during bonding/bumping. A more preferred reaction temperature is between 300 and 480° C.

The GA vapor used in accordance with the present invention has a chemical formula that may be expressed as $HOCH_2COOH$, having two atoms of hydrogen, two atoms of carbon, and two functional groups of alcohol (—OH) and carboxylic acid (—COOH) per molecule. Its boiling point is 113° C. The GA solution in ethanol is a liquid having a vapor pressure of 59 mbar at 20° C. The GA solution is vaporized from the reservoir 10 by nitrogen gas as a carrier. The gas mixture is introduced into a processing chamber 16 for solder bonding/bumping and contacted with the work piece and solder. The GA reacts with and reduces metallic oxides on bond-pads, solder surfaces or bump surfaces. The reaction mechanism involved in this method of using GA vapor as a reducing agent may be stoichiometrically described, assuming a temperature greater than or equal to 200° C., as shown in reaction equation:

$$3MeO + HOCH_2—COOH = 3Me + 2CO_2 + 2H_2O$$

where "Me" is used as a generic symbol for a metal atom, such as copper Cu, tin Sn, lead Pb, indium In, antimony Sb, nickel Ni, or others.

GA vapor would react with metallic oxides on the working piece and solder. The solvent vapor of ethanol and the residual GA vapor will be removed from the system through an exhaust fixed over the bonding heat tunnel or bumping oven.

It should be appreciated that a novel chemical for fluxless soldering processes has been described. The GA has dual functionality with both alcohol and moderately strong acid functional groups on a very small molecule. This results in unique chemical attributes, and makes it a particularly useful reducing reagent for soldering. Experimental results show that GA can much enhance solder-wetting ability, especially at lower solder temperatures than 350° C. as compared to conventional forming gas. Moreover, the die bond quality is improved. On the other hand, the chemical has low corrosivity, less odor, low toxicity, and is biodegradable.

An advantage of using GA vapor as a reducing agent is that it decomposes at bonding/bumping temperatures of 250-500° C., so that it does not contaminate the semiconductor device. More specifically, when the temperature is greater than 250° C., the GA reacts with metal oxide to form a compound, water vapor and carbon dioxide. The metal oxide reduces into metal.

The GA solution is active enough to remove oxide on the bond pads and solder surfaces. The effectiveness certainly makes GA vapor a suitable replacement for the forming gas that is used widely at present. Furthermore, the application of GA solution by nitrogen gas as a carrier is cheap as compared with forming gas, costing significantly less than forming gas. On the other hand, GA solution is safe and convenient as compared with formic acid.

As a result of the aforesaid advantages, the use of the preferred embodiment of the invention achieves various advantages. It improves solder wetting ability, whether for lead-tin solder or other solders with weak wettability, such as PbIn, SnSb, and other lead-free solders. It also enhances bond quality with fewer voids, die tilting, and process variability of bond line thickness and bond placement. Bonding capability (in terms of Units Per Hour) is increased since its activity enables the bonding apparatus to use a quick index system and to reduce spanking time. Therefore, it reduces production cost for the packaging industry.

The invention described herein is susceptible to variations, modifications and/or addition other than those specifically described and it is to be understood that the invention includes all such variations, modifications and/or additions which fall within the spirit and scope of the above description.

The invention claimed is:

1. A method for processing an electronic device comprising oxidizable material during processing, the method comprising the steps of:
   locating the electronic device inside a chamber;
   heating the electronic device to a processing temperature with a heater;
   creating a reductive atmosphere in the chamber by supplying a gas comprising glycolic acid vapor; and
   processing the electronic device at the processing temperature,
   wherein the method is carried out without the introduction of liquid flux.

2. The method as claimed in claim 1, wherein the step of supplying the gas comprising glycolic acid vapor further comprises the step of providing a reservoir of glycolic acid solution for generating the glycolic acid vapor.

3. The method as claimed in claim 2, wherein the glycolic acid solution is formed from dissolving glycolic acid powder in ethanol.

4. The method as claimed in claim 3, wherein the ratio of glycolic acid powder to ethanol in the solution is between 1 gram:1 ml and 1 gram:10 ml.

5. The method as claimed in claim 2, wherein the step of supplying the gas comprising glycolic acid vapor further comprises the step of flowing an inert gas through the glycolic acid reservoir to vaporize the glycolic acid solution.

6. The method as claimed in claim 5, wherein the inert gas is nitrogen gas.

7. The method as claimed in claim 1, wherein the gas comprises a mixture of glycolic acid vapor and an inert gas carrier.

8. The method as claimed in claim 7, wherein the inert gas carrier is nitrogen gas.

9. The method as claimed in claim 1, wherein the gas is supplied at a temperature of 250° C. to 500° C.

10. The method as claimed in claim 1, further comprising the step of exhausting residual glycolic acid vapor from the chamber.

11. The method as claimed in claim 1, wherein the step of processing the electronic device comprises performing die bonding or solder bumping on the electronic device.

12. A method for processing an electronic device, the method comprising the steps of:
   locating the electronic device inside a chamber;
   heating the electronic device to a processing temperature with a heater;
   creating a reductive atmosphere in the chamber by supplying a gas comprising glycolic acid vapor;
   dispensing solder onto the electronic device at the processing temperature and melting the solder while the electronic device is inside the chamber; and
   bonding a die onto the melted solder in order to bond the die to the electronic device inside the chamber.

* * * * *